US010052919B2

(12) United States Patent
Asper et al.

(10) Patent No.: US 10,052,919 B2
(45) Date of Patent: Aug. 21, 2018

(54) TIRE WITH PRE-STRESSED TOROIDAL ELEMENT

(71) Applicant: Bridgestone Americas Tire Operations, LLC, Nashville, TN (US)

(72) Inventors: Robert Asper, Wadsworth, OH (US); Sharon Reinhardt, Fairlawn, OH (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 452 days.

(21) Appl. No.: 14/662,747

(22) Filed: Mar. 19, 2015

(65) Prior Publication Data

US 2015/0283857 A1    Oct. 8, 2015

Related U.S. Application Data

(60) Provisional application No. 61/976,076, filed on Apr. 7, 2014.

(51) Int. Cl.
*B60C 7/10* (2006.01)
*B60C 7/22* (2006.01)
(Continued)

(52) U.S. Cl.
CPC .......... *B60C 17/0009* (2013.01); *B29D 30/02* (2013.01); *B29D 30/30* (2013.01);
(Continued)

(58) Field of Classification Search
CPC .. B60C 7/00; B60C 7/10; B60C 7/102; B60C 7/22; B60C 7/24
See application file for complete search history.

(56) References Cited

U.S. PATENT DOCUMENTS 3,256,922 A    6/1966 McFee
4,287,924 A    9/1981 Deck et al.
(Continued)

FOREIGN PATENT DOCUMENTS

DE    1262580    3/1968
DE    3442561 *  5/1986
(Continued)

OTHER PUBLICATIONS

International Preliminary Report on Patentability and Written Opinion; corresponding PCT Application No. PCT/US2015/021396; dated Oct. 12, 2016.
(Continued)

*Primary Examiner* — Justin R Fischer
(74) *Attorney, Agent, or Firm* — Squire Patton Boggs (US) LLP

(57) ABSTRACT

A tire includes at least one body defining a plurality of body ply layers, and a toroidal element located between the body ply layers. The toroidal element includes inner and outer regions formed by the body ply layers, and a central region formed by an inner rubber component located between the body ply layers. At least a portion of the central region is more elastic than the inner and outer regions. The toroidal element includes a first sidewall portion extending along at least a portion of the first sidewall region of the tire, and a second sidewall portion extending along at least a portion of the second sidewall region of the tire. The toroidal element is pre-stressed such that the first sidewall portion of the toroidal element exerts a first axially outward force, and such that the second sidewall portion of the toroidal element exerts a second axially outward force.

12 Claims, 8 Drawing Sheets

(51) Int. Cl.
*B60C 7/24* (2006.01)
*B60C 17/00* (2006.01)
*B60B 9/00* (2006.01)
*B60C 15/00* (2006.01)
*B60C 15/02* (2006.01)
*B29D 30/02* (2006.01)
*B29D 30/30* (2006.01)
*B29D 30/32* (2006.01)
*B29D 30/36* (2006.01)
*B60B 25/00* (2006.01)
*B60C 7/14* (2006.01)
*B60C 9/02* (2006.01)
*B60C 7/26* (2006.01)
*B29D 30/20* (2006.01)

(52) U.S. Cl.
CPC ............ *B29D 30/32* (2013.01); *B29D 30/36* (2013.01); *B60B 9/00* (2013.01); *B60B 25/006* (2013.01); *B60C 7/102* (2013.01); *B60C 7/14* (2013.01); *B60C 15/0045* (2013.01); *B60C 15/0216* (2013.01); *B60C 17/0018* (2013.01); *B29D 2030/201* (2013.01); *B29D 2030/3207* (2013.01); *B60B 25/008* (2013.01); *B60C 7/26* (2013.01); *B60C 2009/0223* (2013.01); *Y10T 152/10864* (2015.01)

(56) References Cited

U.S. PATENT DOCUMENTS

| | | |
|---|---|---|
| 4,425,953 A | 1/1984 | Rohde et al. |
| 5,238,040 A | 8/1993 | Ghilardi |
| 5,368,082 A | 11/1994 | Oare et al. |
| 5,427,166 A | 6/1995 | Willard, Jr. |
| 5,511,599 A | 4/1996 | Willard, Jr. |
| 5,795,416 A | 8/1998 | Willard, Jr. et al. |
| 6,053,229 A * | 4/2000 | Suzuki ................ B29D 30/32 152/541 |
| 6,405,773 B1 | 6/2002 | Vossberg et al. |
| 6,439,288 B1 | 8/2002 | Spragg et al. |
| 6,460,586 B1 | 10/2002 | Spragg et al. |
| 6,530,404 B1 | 3/2003 | Rooney |
| 6,688,357 B1 * | 2/2004 | Gerresheim ........ B60C 15/0018 152/517 |
| 6,901,983 B2 | 6/2005 | Murata |
| 7,172,000 B2 | 2/2007 | Ferlin |
| 2002/0088551 A1 | 7/2002 | Beck, Jr. et al. |
| 2004/0140032 A1 | 7/2004 | Rhyne et al. |

FOREIGN PATENT DOCUMENTS

| | | | |
|---|---|---|---|
| EP | 125047 B1 | | 6/1988 |
| EP | 1156937 | | 11/2001 |
| EP | 1400374 | | 3/2004 |
| EP | 1857300 | | 11/2007 |
| GB | 883645 | * | 12/1961 |
| GB | 2199792 | * | 7/1988 |
| JP | 9-66715 | * | 3/1997 |
| JP | 11217010 | * | 8/1999 |
| JP | 2002178721 | | 6/2002 |
| JP | 2004-98292 | * | 4/2004 |
| JP | 2004-249871 | * | 9/2004 |
| WO | 2008073098 A1 | | 6/2008 |
| WO | WO 2015153001 | * | 10/2015 |

OTHER PUBLICATIONS

Lee, Chang Ho. International Search Report from PCT/US2015/021396. dated Mar. 19, 2015.

European Search Report; corresponding EP Application No. EP15777488; dated Nov. 3, 2017.

European Search Opinion; corresponding EP Application No. EP15777488; dated Nov. 3, 2017.

* cited by examiner

TIRE WITH PRE-STRESSED TOROIDAL ELEMENT

FIELD OF INVENTION

The present disclosure relates to a tire having a toroidal element. More particularly, the present disclosure relates to a tire having a toroidal element extending across a crown region of the tire and along at least a portion of each sidewall region of the tire.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. One such type of run flat tire incorporates a thin annular high strength band element which acts as a tension member when the tire is pressurized and acts as a structural compression member when the tire is in the unpressurized or partially pressurized state.

SUMMARY OF THE INVENTION

In one embodiment, a tire has a crown region and a pair of sidewall regions, including a first sidewall region and a second sidewall region. The tire includes a pair of beads, including a first bead and a second bead. The tire also includes at least one body defining a plurality of body ply layers, and a toroidal element located between the body ply layers. The toroidal element includes inner and outer regions formed by the body ply layers, and a central region formed by an inner rubber component located between the body ply layers. At least a portion of the central region is more elastic than the inner and outer regions. The toroidal element includes a crown portion extending across the crown region of the tire. The toroidal element includes a first sidewall portion extending along at least a portion of the first sidewall region of the tire, and a second sidewall portion extending along at least a portion of the second sidewall region of the tire. The toroidal element is pre-stressed such that the first sidewall portion of the toroidal element exerts a first axially outward force, and such that the second sidewall portion of the toroidal element exerts a second axially outward force.

In another embodiment, a tire and rim assembly includes a rim having a pair of wheel flanges, including a first wheel flange and a second wheel flange. A tire is fastened to the rim, and the tire includes a tread formed in a crown region of the tire, and a first sidewall region extending from the crown region to a first bead area, the first sidewall region of the tire being affixed to the first wheel flange of the rim. The tire further include a second sidewall region opposite the first sidewall region, the second sidewall region extending from the crown region to a second bead area, the second sidewall region of the tire being affixed to the second wheel flange of the rim. The tire also includes a toroidal element extending across a crown region of the tire, further extending along at least a portion of the first sidewall region of the tire, and further extending along at least a portion of the second sidewall region of the tire. The toroidal element has a central region located between inner and outer regions. The central region is more elastic than the inner and outer regions. The toroidal element is pre-stressed such that the toroidal element exerts a first axially outward force against the first wheel flange of the rim. The toroidal element exerts a second axially outward force against the second wheel flange of the rim.

In yet another embodiment, a method of making a tire and rim assembly includes providing a rim having a pair of rim flanges, and forming a green tire. The green tire has a green tread and a pair of bead regions, with each of the pair of bead regions being axially outside and radially below the tread. The green tire further has green sidewall regions extending from the tread to the bead regions. The green tire also has a green toroidal element disposed radially below the tread and radially below at least a portion of each sidewall region, the green toroidal element having a pair of inextensible ply layers with green rubber disposed between the inextensible ply layers. The method further includes curing the green tire, moving the pair of bead regions axially inward, and mounting the tire on the rim by placing the pair of bead regions in the pair of rim flanges.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Bead" refers to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
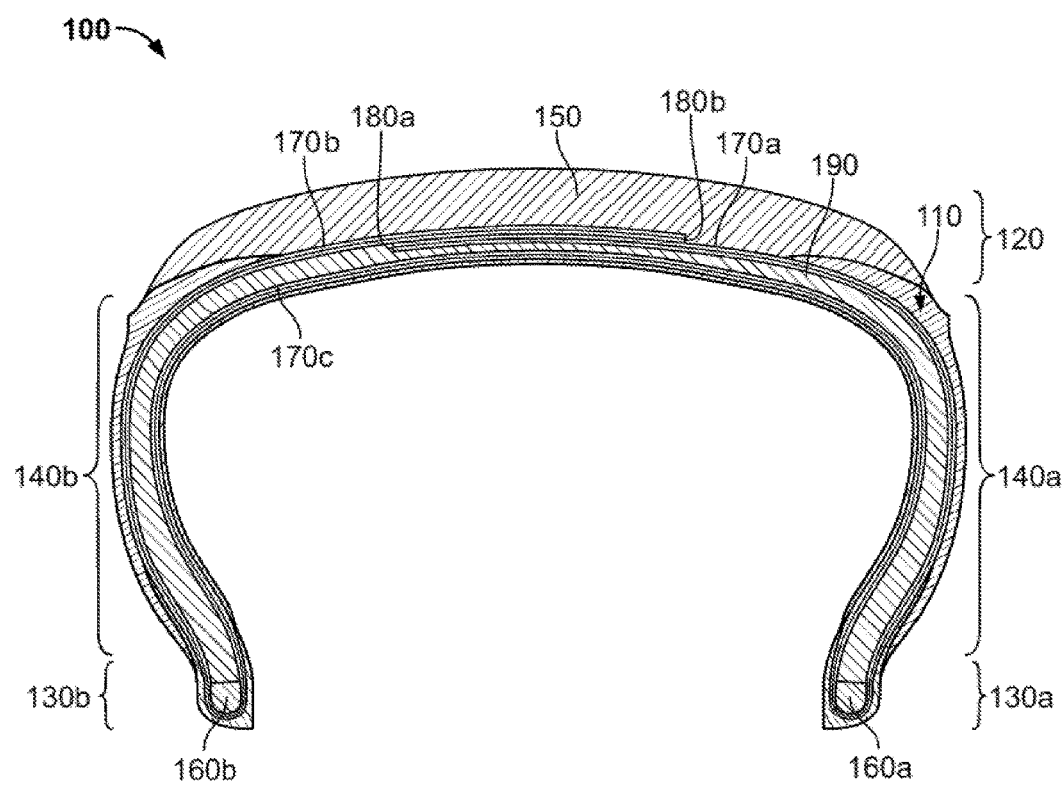
FIG. 1 is a cross-section of a tire 100 having one embodiment of a toroidal element 110 incorporated therein.

FIG. 1 is a cross-section of a tire 100 having a toroidal element 110 incorporated therein. Tire 100 includes a crown region 120, a pair of bead regions 130, including a first bead region 130a and a second bead region 130b, and a pair of sidewall regions 140a,b extending from the crown region 120 to the bead regions 130. A tread 150 is formed in the crown region 120 of the tire. Each bead region 130 includes a bead 160 and may optionally include a bead filler (not shown), a gum abrasion strip (not shown), and other components therein.

Tire 100 further includes a pair of body plies 170 having first turned-up portions 170a, second turned up portions 170b, and main portions 170c. The main portions 170c extend circumferentially about the tire from a first bead 160a to a second bead 160b. The first turned-up portions 170a extend around the first bead 160a and terminate at a first end 180a in the crown region 120 of the tire 100. The second turned-up portions 170b extend around the second bead 160b and terminate at a second end 180b in the crown region 120 of the tire 100, such that the first turned-up portions 170a overlaps the second turned-up portions 170b. In an alternative embodiment (not shown), the first turned-up portion does not overlap the second turned-up portion. Instead, additional plies span the crown region overlapping both turn-up ends. While a pair of body plies 170 are shown in FIG. 1, it should be understood that this is for illustrative purposes. In a commercialized embodiment, the tire may include a single body ply, or three or more body plies.

Construction of body plies is known in the art. The body plies may include rubber and reinforcement cords constructed of fabric such as cotton, rayon, nylon, polyester, aramid fibers, or metal. The body plies may be described as inextensible.

In the illustrated embodiment, the toroidal element 110 includes the body ply cords 170 as well as an inner rubber component 190. The rubber component 190 is sandwiched between the main portions 170c of the body plies and the turned up portions 170a,b. The toroidal element 110 therefore stretches from bead to bead, and include the beads 160a,b. The resulting structure is shaped like a traditional pneumatic tire, but is sufficiently stiff enough to carry loads typical of a similarly sized pneumatic tire without requiring internal air pressure for preload. The design does not preclude or require the use of internal air pressure.

While the illustrated embodiments generally show a rubber portion 190 disposed between a main portion 170c of a body ply and turn up portions 170a,b of the body ply, it should be understood that any combination of rubber layers and body ply layers may be employed. The body ply layers may be formed of a single body ply that forms a main portion and turned-up portions, or a main portion and turned-down portion. The body ply layers may also be formed of multiple body plies that form multiple main portions and multiple turned-up portions, or multiple main portions and multiple turned-down portions. The body ply layers may also be formed of separate body plies.

In an alternative embodiment (not shown), the toroidal element is a partial toroidal element that extends into one sidewall of the tire, but not both sidewalls.

The toroidal element 110 is configured to increase interlaminar shear strength across the axial length of the tire 100 as well as in the sidewall regions 140 of the tire. This allows for the tire 100 to flex in the manner shown in FIG. 2 when the tire is under a load, and may improve durability of the tire.

As one of ordinary skill in the art would understand, the tire 100 may also include a belt (not shown) in the crown region 120. In one embodiment, the toroidal element 110 has a consistent thickness throughout. In an alternative embodiment, the toroidal element has a first thickness in the crown region and a second thickness greater than the first thickness in a region outside the belt. In another alternative embodiment, the toroidal element has a first thickness in the crown region and a second thickness less than the first thickness in a region outside the belt.

Figure 3:
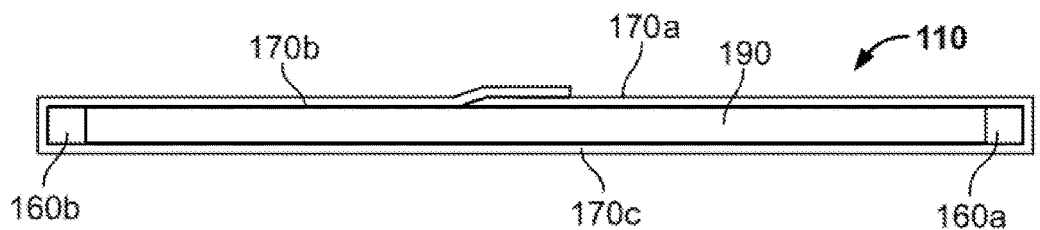
FIG. 3 is a schematic drawing of one embodiment of the toroidal element 110 shown in a straight condition for illustrative purposes.

FIG. 3 is a schematic drawing of one embodiment of a toroidal element 110 shown in a straight condition for illustrative purposes. As discussed above, the rubber component 190 is sandwiched between the main portions 170c of the body plies and the turned up portions 170a,b. The toroidal 110 therefore stretches from bead to bead, and include the beads 160a,b. In building a tire, the rubber component 190 may initially be straight, as shown, and then bent to a toroidal shape. Alternatively, the rubber component 190 may be pre-formed in a toroidal shape.

Figure 4:
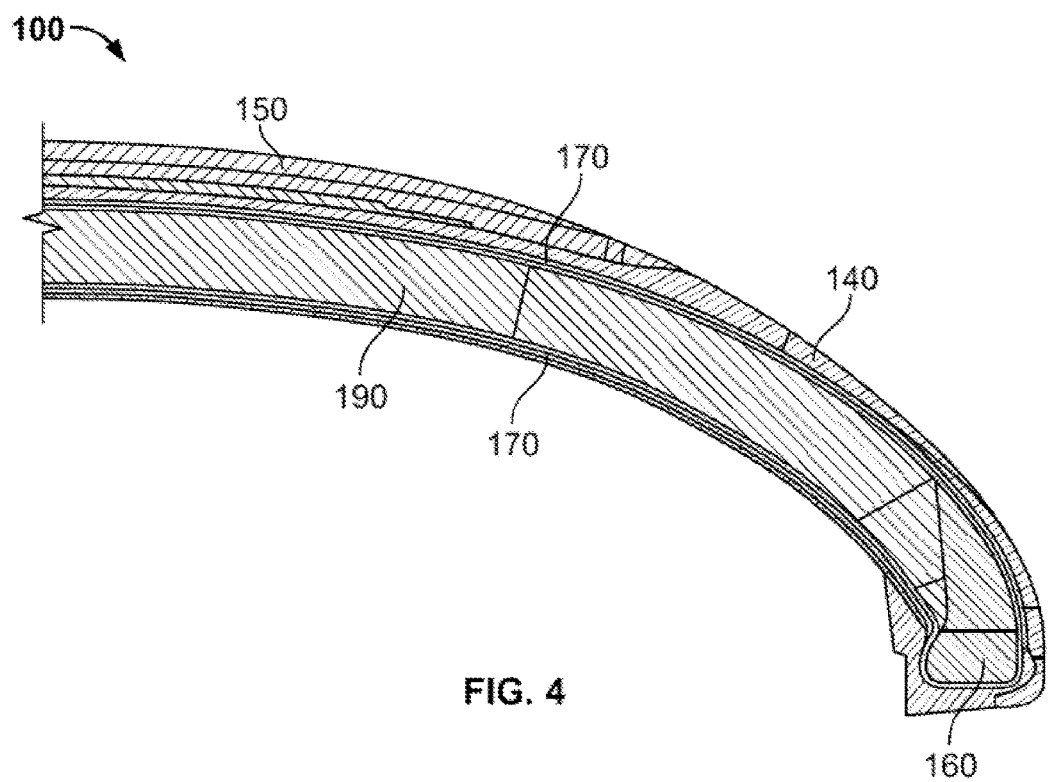
FIG. 4 is a partial cross-section of an alternative embodiment of the tire 100 in an unstressed condition.

FIG. 4 is a partial cross-section of an alternative embodiment of the tire 100 in an unstressed condition. In this embodiment, the tire 100 is formed with an initial shape as shown. In the illustrated embodiment, the initial shape is substantially parabolic, such that the beads 160 are located axially outside and radially below the tread 150. In alternative embodiments (not shown), the initial shape may be any curved shape in which the beads are located axially outside and radially below the tread.

To form the tire shown in FIG. 4, the method includes forming a green tire having a green tread and a pair of beads, with each of the pair of beads being axially outside and radially below the tread. The green tire further includes green sidewall regions extending from the green tread to the bead regions. The green tire also includes a green toroidal element disposed radially below the tread and radially below at least a portion of each sidewall region. The green toroidal element includes a pair of inextensible plies with green rubber disposed between the inextensible plies. In an alternative embodiment, a toroidal element having cured or partially cured rubber disposed between inextensible plies may be employed.

After the green tire is formed, it is cured to form the unstressed tire 100 shown in FIG. 4. A rim (not shown) having a pair of wheel flanges is provided. The pair of beads 160 of the unstressed tire 100 are then moved axially inward, such that each of the pair of beads 160 is disposed directly below a portion of the tread 150. In an alternative embodiment, the beads remain axially outside the tread 150.

After the beads 160 are moved inward, the tire 100 is mounted on the rim by placing bead regions defined by the beads 160 in the pair of wheel flanges. The bead regions of the tire 100 are then affixed to the wheel flanges of the rim, thereby forming a pre-stressed tire and rim assembly.

In one embodiment, the bead regions of the tire 100 are affixed to the wheel flanges of the rim by bolts. In alternative embodiments, other fasteners such as screws, glue or other adhesive, compression fit or using bead compression as may be used in existing pneumatic tires may be employed. In another alternative embodiment, the sidewalls of the tire may be affixed to the wheel flange at locations above the bead region of the tire.

In one embodiment, the beads 160 of the unstressed tire 100 are moved axially inward by hand. However, this step will more likely be performed by a clamping machine. Such a clamping machine would use higher forces than today's mounting machines. In one known embodiment, moving the pair of bead regions axially inward includes applying at least 1000 pounds of force to move the pair of bead regions axially inward. In this embodiment, when the tire is mounted on the rim, the pre-stressed tire applies an outward force of at least 1000 pounds against the wheel flanges. In another known embodiment, moving the pair of bead regions axially inward includes applying at least 5000 pounds of force to move the pair of bead regions axially inward. In this embodiment, when the tire is mounted on the rim, the pre-stressed tire applies an outward force of at least 5000 pounds against the wheel flanges.

Analysis of a pre-stressed tire of the above design shows that the tire would have a contact patch similar to a pneumatic tire, even when no inflation pressure is applied to the tire. This is because the cords develop similar forces in the contact region as the forces generated by the air pressure in a standard pneumatic tire. Compared to other non-pneumatic or runflat designs which rely on stiffness alone to carry the load, the contact of the pre-stressed tire results in a large contact area with lower contact pressure which is more uniform. The design also exhibits lower propensity to buckle in the contact area. Buckling in this manner creates areas of lost contact or high contact pressure in the contact area.

Figure 2:
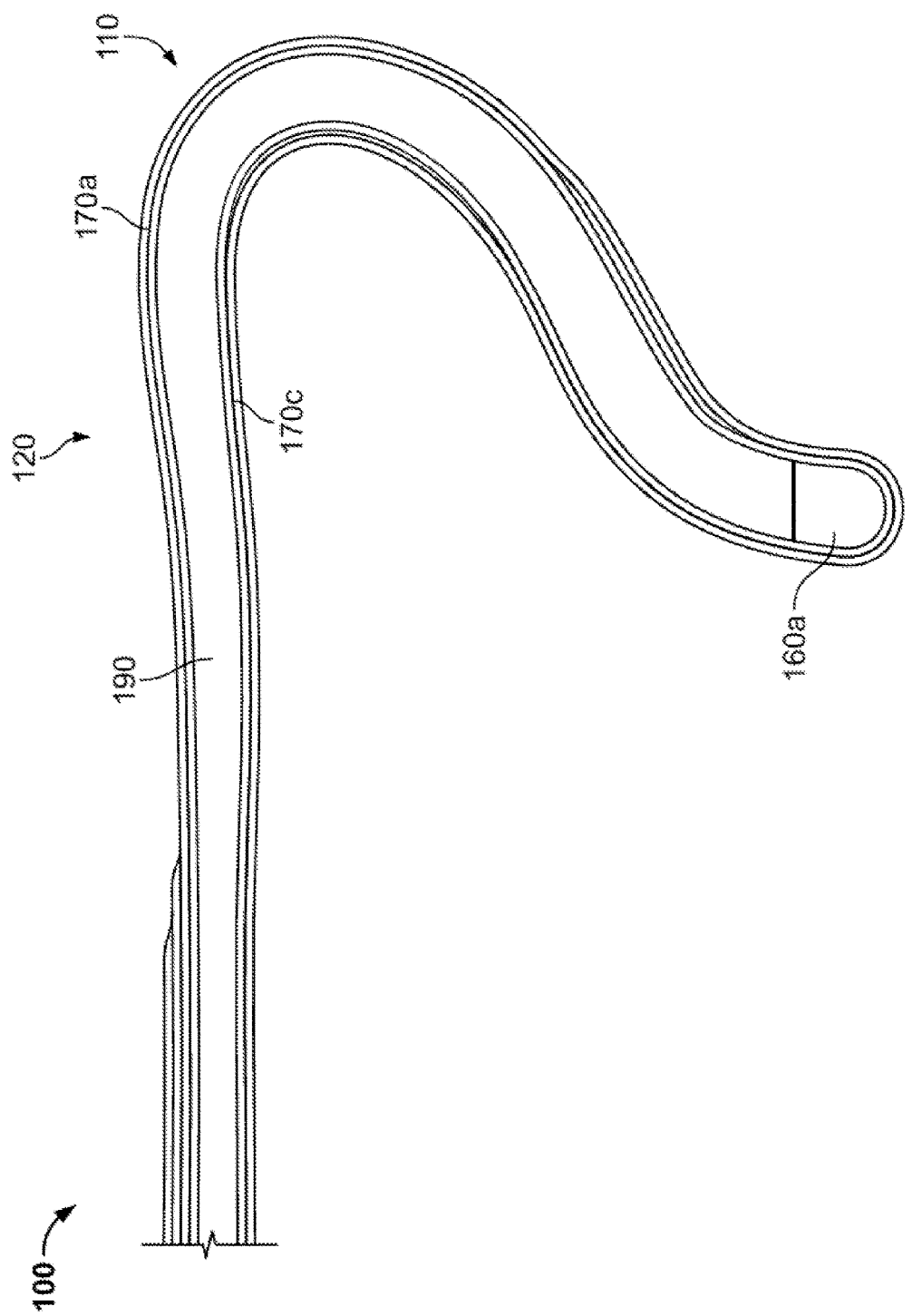
FIG. 2 is a cross-section of the tire 100 under a load.
Figure 5:
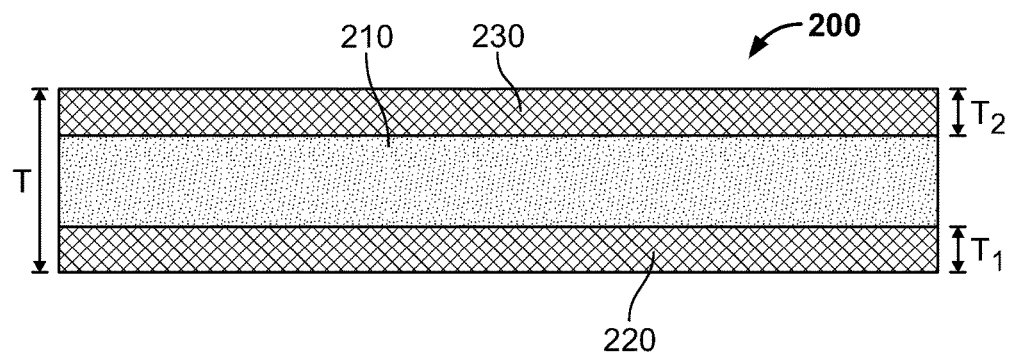
FIG. 5 is a schematic drawing of a of a partial cross-section of an alternative embodiment of a toroidal element.

FIG. 5 is a schematic drawing of a partial cross-section of an exemplary toroidal element 200 that may be used as the toroidal element 110 in the tire 100 in FIGS. 1, 2, and 4. The toroidal element 200 has three distinct regions. As discussed above, in the embodiment of FIGS. 1, 2, and 4, the central or interior region 210 is of the internal rubber component 190, and the inner region 220 and outer region 230 are formed by the main portions 170c and the turned-up portions 170a,b of the body plies 170. As one of ordinary skill in the art would understand, with such a construction, the central region has high interlaminar shear strength, and the inner region 220 and outer region 230 have a high flexural modulus in the circumferential direction. In other words, the central region 210 is more elastic than the inner and outer regions 220, 230.

In the illustrated embodiment, the overall thickness of the toroidal element 200 is indicated by reference character T while the thickness of the inner region is indicated by reference character $T_1$ and the thickness of the outer region is indicated by reference character $T_2$. The radial thickness of the outer, central, and inner regions can be in various combinations. In one known embodiment, the thicknesses of the regions will be within the general range of $T/3 > T_1 > T/10$ and $T/3 > T_2 > T/10$. In one particular embodiment, the thicknesses of the regions will be within the range of $T/4 > T_1 > T/8$ and $T/4 > T_2 > T/8$. In one known embodiment, the thickness of the inner region $T_1$ is equal to the thickness of the outer region $T_2$.

In one embodiment, the flexural modulus of the inner and outer regions is determined for example by ASTM D790-97, and is within the range of $3.4 \times 10^{10}$ Pa $< E_{circumferential} < 2.1 \times 10^{11}$ Pa. In one particular embodiment, the flexural modulus of the inner and outer regions is within with the range $4.1 \times 10^{10}$ Pa $< E_{circumferential} < 1.4 \times 10^{11}$ Pa.

As would be understood by those skilled in the art, the toroidal element may also be constructed of other materials, such that the element has a central region with high interlaminar shear strength, and the inner and outer regions with a high flexural modulus in the circumferential direction. In one alternative embodiment, the central region of the toroidal element is formed of a layer of rubber and the inner and outer regions are formed of a resin. In an alternative embodiment, the central region is formed of a layer of rubber, and the body plies of the tire form the inner and outer regions of the toroidal element. In both embodiments, the rubber layer may bond the inner and outer regions together so that the three regions function as one monolithic composite. The rubber will have sufficient strength to hold the three regions together so that in bending the cross sectional moment of inertia is based upon the aggregate of the three regions. The rubber central region may also include a plurality of randomly oriented fibers.

In one alternative embodiment, the central region is constructed of a rubber compound having a high modulus and a low tan δ. In one known embodiment, a sulfur vulcanizable rubber compound, following vulcanization, has a mechanical static modulus in the range of $9.7 \times 10^6$ Pa to $2.8 \times 10^7$ Pa at 15% strain, a loss modulus or tan δ in the range of 0.03 to 0.20 measured at 100° C., 7% deflection and 10 Hz, and has a Shore A hardness in the range of 70 to 97.

It should be understood that various resin adhesives or combination thereof can be utilized to construct the toroidal element. Polyphenylsulfide ("PPS") and Polytherimide ("PEI") are representative examples of resins commercially available and suitable for the thermoplastic composites. Thermosetting composites, epoxy adhesives and toughened epoxy adhesives also are readily available materials well known in the art and available from many sources. For example, a toughened epoxy adhesive is identified as F351 from Nippon Zeon (U.S. Pat. No. 5,290,857, incorporated herein by reference in its entirety).

In any of the above described embodiments, construction of the three regions can be accomplished by known fabrication techniques, including without limitation homogenous filament winding, non-homogeneous filament winding, multilayer tape composite winding, winding with prepreg materials, winding with wet woven materials, winding with mats, winding with resin transfer molding processes, winding with wet or prepreg woven preforms, and any combination of some or all of the above. The particular materials and fiber orientations and arrangements may be selected to achieve optimum performance of the toroidal element.

Although the drawings and following description show and describe three distinct layers, it should be understood that the three regions of the toroidal element have certain properties which can be achieved in a single homogenous material, or a combination of more than three layers.

Figure 6:
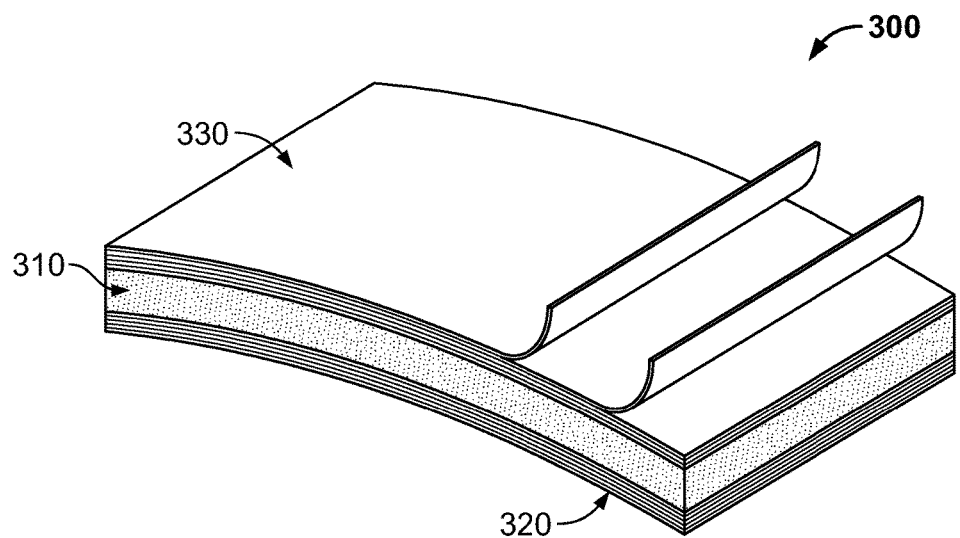
FIG. 6 is a partial perspective view of one specific alternative embodiment of a toroidal element.

FIG. 6 is a partial perspective view of one specific alternative embodiment of a toroidal element 300. In this embodiment, the interior or central region indicated generally at 310, is formed as a single layer of a suitable resin free of any reinforcing fibers. The resin can be PPS, PEI, epoxy adhesive, a toughened epoxy adhesive or the like as discussed above. Inner layer 320 and outer layer 330 can be formed of various materials such as various types of thermoplastic tapes or layers of thermosetting resins, and can be formed by known fabrication processes. In one embodiment, inner and outer regions 320 and 330 will be of the same material and of the same thickness, and will have a higher modulus than that of central region 310.

In an alternative embodiment (not shown), the central region of the toroidal element is made of multiple layers of resin-only tape, which are laid up to form central region in a similar manner as described in U.S. Pat. No. 5,879,484, which is incorporated herein by reference in its entirety. In one such embodiment, the inner and outer regions may be reinforced with graphite fibers while the central region may be reinforced with glass fibers.

In another alternative embodiment (not shown), the central region is constructed of resin reinforced by randomly oriented fibers, which fibers extend in the circumferential direction, the radial direction, the lateral direction and combinations thereof. Such a region may be formed by a filament winding process, which produces a thick tow of randomly oriented fibers which is then wound into the central region. However, the other fabrication techniques can also be utilized.

The randomly oriented fibers in central region resist the interlaminar shear slippage of the circumferential planes, because the fibers cross the neutral axis in all directions. Additionally, this random arrangement of fibers provide for increased peel strength of the toroidal element where peel strength is characterized by the ability of the toroidal element to withstand stresses in the radial direction.

In still another alternative embodiment (not shown) the central region of the toroidal element is constructed of fiberglass tow with reinforcement fibers oriented in the circumferential direction within the tow. Alternatively, the reinforcement fibers may be oriented randomly. Additional constructions of known band elements are described in U.S. Pat. No. 6,460,586, which is incorporated herein by reference in its entirety.

Figure 7:
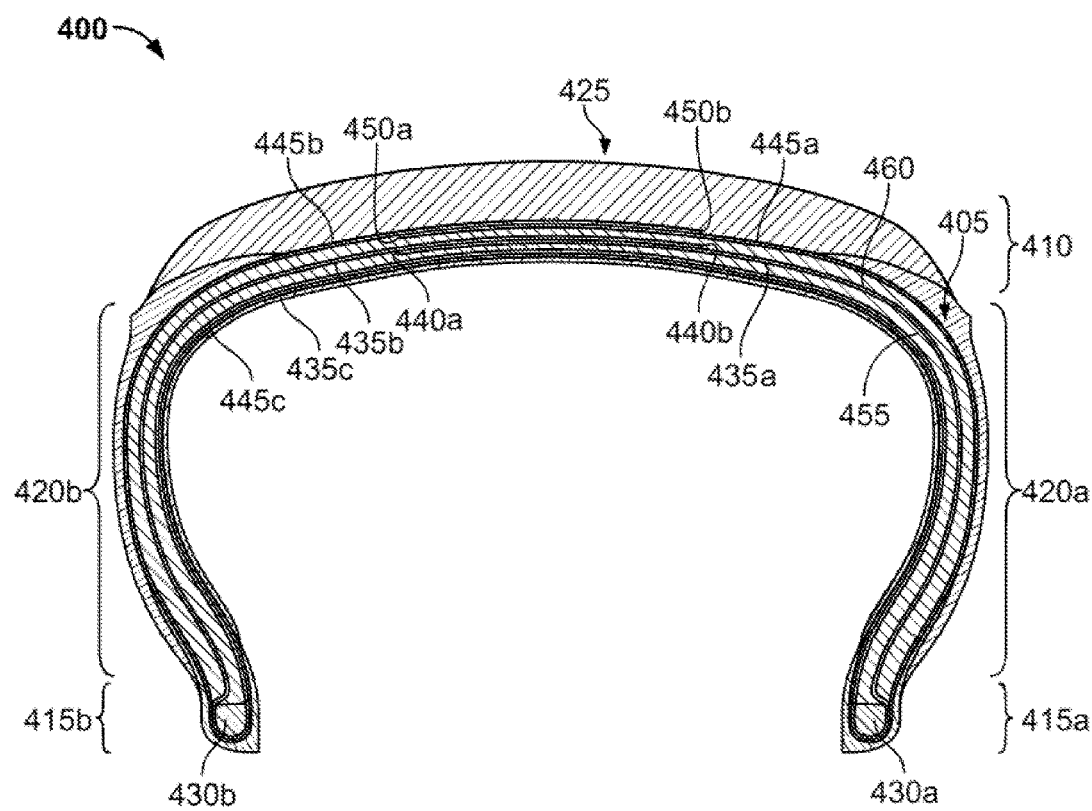
FIG. 7 is a cross-section of a tire 400 having an alternative embodiment of a toroidal element 405 incorporated therein.

FIG. 7 illustrates a cross-section of a tire 400 having an alternative embodiment of a toroidal element 405 incorporated therein. Tire 400 includes a crown region 410, a pair of bead regions 415, including a first bead region 415a and a second bead region 415b, and a pair of sidewall regions 420a,b extending from the crown region 410 to the bead regions 415. A tread 425 is formed in the crown region 410 of the tire. Each bead region 415 includes a bead 430 and may optionally include a bead filler (not shown), a gum abrasion strip (not shown), and other components therein.

Tire 400 further includes a first body ply 435 having a first turned-up portion 435a, a second turned up portion 435b, and a main portion 435c. The main portion 435c extends circumferentially about the tire from a first bead 430a to a second bead 430b. The first turned-up portion 435a extends around the first bead 430a and terminates at a first end 440a in the crown region 410 of the tire 400. The second turned-up portion 435b extends around the second bead 430b and terminates at a second end 440b in the crown region 410 of the tire 400, such that the first turned-up portion 435a overlaps the second turned-up portion 435b.

Tire 400 further includes a second body ply 445 having a first turned-up portion 445a, a second turned up portion 445b, and a main portion 445c. The main portion 445c extends circumferentially about the tire from a first bead 430a to a second bead 430b. The first turned-up portion 445a extends around the first bead 430a and terminates at a first end 450a in the crown region 410 of the tire 400. The second turned-up portion 445b extends around the second bead 430b and terminates at a second end 450b in the crown region 410 of the tire 400, such that the first turned-up portion 445a overlaps the second turned-up portion 445b.

In the illustrated embodiment, the toroidal element 405 includes the body ply cords 435, 445 as well as a first inner rubber component 455 and a second inner rubber component 460. The first inner rubber component 455 is sandwiched between the main portions 435c, 445c of the first and second body plies 435, 445 and the turned up portions 435a,b of the first body ply 435. The second inner rubber component 460 is sandwiched between the turned up portions 435a,b of the first body ply 435 and the turned up portions 445a,b of the second body ply 445. The toroidal element 405 therefore stretches from bead to bead, and include the beads 430a,b.

Figure 8:
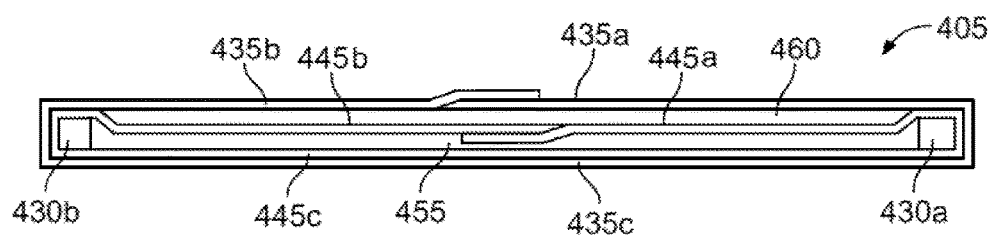
FIG. 8 is a schematic drawing of an alternative embodiment of the toroidal element 405 shown in a straight condition for illustrative purposes.

FIG. 8 is a schematic drawing of one embodiment of the toroidal element 405 of FIG. 7 shown in a straight condition for illustrative purposes. The first rubber component 455 is sandwiched between the main portion 435c, 445c of the first and second body plies 435, 445 and the turned up portions 435a,b of the first body ply 435. The second rubber component 460 is sandwiched between the turned up portions 435a,b of the first body ply 435 and the turned up portions 445a,b of the second body ply 445. The toroidal element 405 therefore stretches from bead to bead, and include the beads 430a,b. In building a tire, the first and second rubber components 455, 460 may initially be straight, as shown, and then bent to a toroidal shape. Alternatively, the first and second rubber components 455, 460 may be pre-formed in a toroidal shape. In an alternative embodiment (not shown), the toroidal element is a partial toroidal element that extends into one sidewall of the tire, but not both sidewalls.

While the illustrated embodiments generally show a rubber components 455, 460 disposed between main portions 435c, 445c of body plies and turned-up portions 435a,b and 445a,c of the body plies, it should be understood that any combination of rubber layers and body ply layers may be employed. The body ply layers may be formed of multiple body plies that form multiple main portions and multiple turned-up portions, or multiple main portions and multiple turned-down portions. The body ply layers may also be formed of separate body plies.

Figure 9:
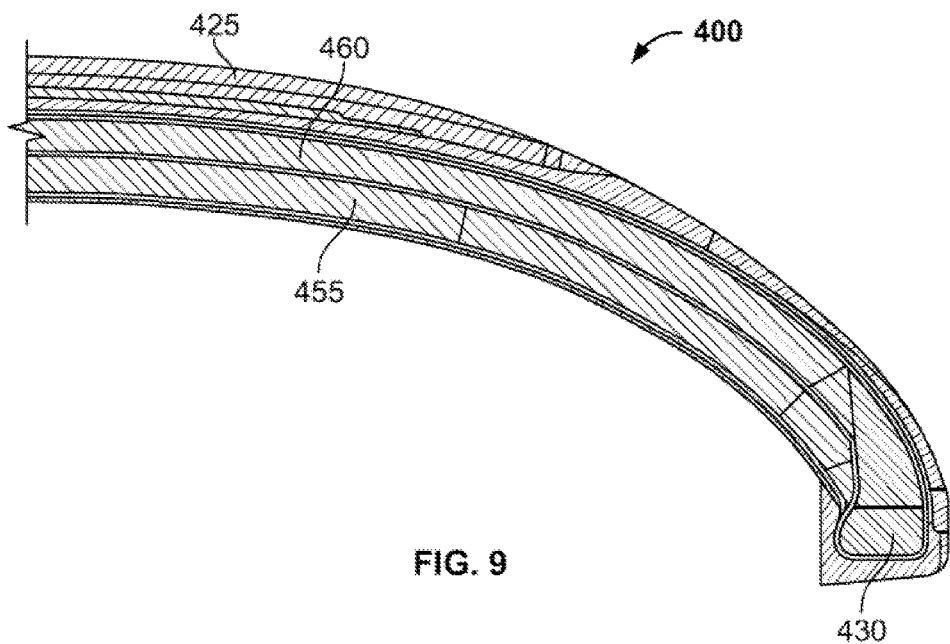
FIG. 9 is a partial cross-section of an alternative embodiment of the tire 400 in an unstressed condition.

FIG. 9 is a cross-section of an alternative embodiment of the tire 400 in an unstressed condition. In this embodiment, the tire 400 is formed with an initial shape as shown. In the illustrated embodiment, the initial shape is substantially parabolic, such that the beads 430 are located axially outside and radially below the tread 425. In alternative embodiments (not shown), the initial shape may be any curved shape in which the beads are located axially outside and radially below the tread.

To form the tire shown in FIG. 9, the method includes forming a green tire having a green tread and a pair of beads, with each of the pair of beads being axially outside and radially below the tread. The green tire further includes green sidewall regions extending from the green tread to the bead regions. The green tire also includes a green toroidal element disposed radially below the tread and radially below at least a portion of each sidewall region. The green toroidal element includes a pair of inextensible plies with green rubber disposed between the inextensible plies. In an alternative embodiment, a toroidal element having cured or partially cured rubber disposed between inextensible plies may be employed.

After the green tire is formed, it is cured to form the unstressed tire 400 shown in FIG. 9. A rim (not shown) having a pair of wheel flanges is provided. The pair of beads 430 of the unstressed tire 400 are then moved axially inward, such that each of the pair of beads 430 is disposed directly below a portion of the tread 425. In an alternative embodiment, the beads remain axially outside the tread 425.

After the beads 430 are moved inward, the tire 400 is then mounted on the rim by placing bead regions defined by the pair of beads 430 in the pair of wheel flanges. The bead regions of the tire 400 are then affixed to the wheel flanges of the rim, thereby forming a pre-stressed tire and rim assembly.

In one embodiment, the bead regions of the tire 400 are affixed to the wheel flanges of the rim by bolts. In alternative embodiments, other fasteners such as as screws, glue or other adhesive, compression fit or using bead compression as may be used in existing pneumatic tires may be employed. In another alternative embodiment, the sidewalls of the tire may be affixed to the wheel flange at locations above the bead region of the tire.

In one embodiment, the beads 430 of the unstressed tire 400 are moved axially inward by hand. However, this step will more likely be performed by a clamping machine using higher forces than today's mounting machines. In one known embodiment, moving the pair of bead regions axially inward includes applying at least 1000 pounds of force to move the pair of bead regions axially inward. In this embodiment, when the tire is mounted on the rim, the pre-stressed tire applies an outward force of at least 1000 pounds against the wheel flanges. In another known embodiment, moving the pair of bead regions axially inward includes applying at least 5000 pounds of force to move the pair of bead regions axially inward. In this embodiment, when the tire is mounted on the rim, the pre-stressed tire applies an outward force of at least 5000 pounds against the wheel flanges.

Analysis of a pre-stressed tire of the above design shows that the tire would have a contact patch similar to a pneumatic tire, even when no inflation pressure is applied to the tire. This is because the cords develop similar forces in the contact region as the forces generated by the air pressure in a standard pneumatic tire. Compared to other non-pneumatic or runflat designs which rely on stiffness alone to carry the load, the contact of the pre-stressed tire results in a large contact area with lower contact pressure which is more uniform. The design also exhibits lower propensity to buckle in the contact area. Buckling in this manner creates areas of lost contact or high contact pressure in the contact area.

The toroidal element 405 described above includes alternating layers of extensible and substantially inextensible material. While the illustrated embodiment of FIGS. 7-9 shows alternating layers of rubber material and body plies, it should be understood that the layers may include any of the materials described above in alternative embodiments of toroidal elements.

Figure 10:
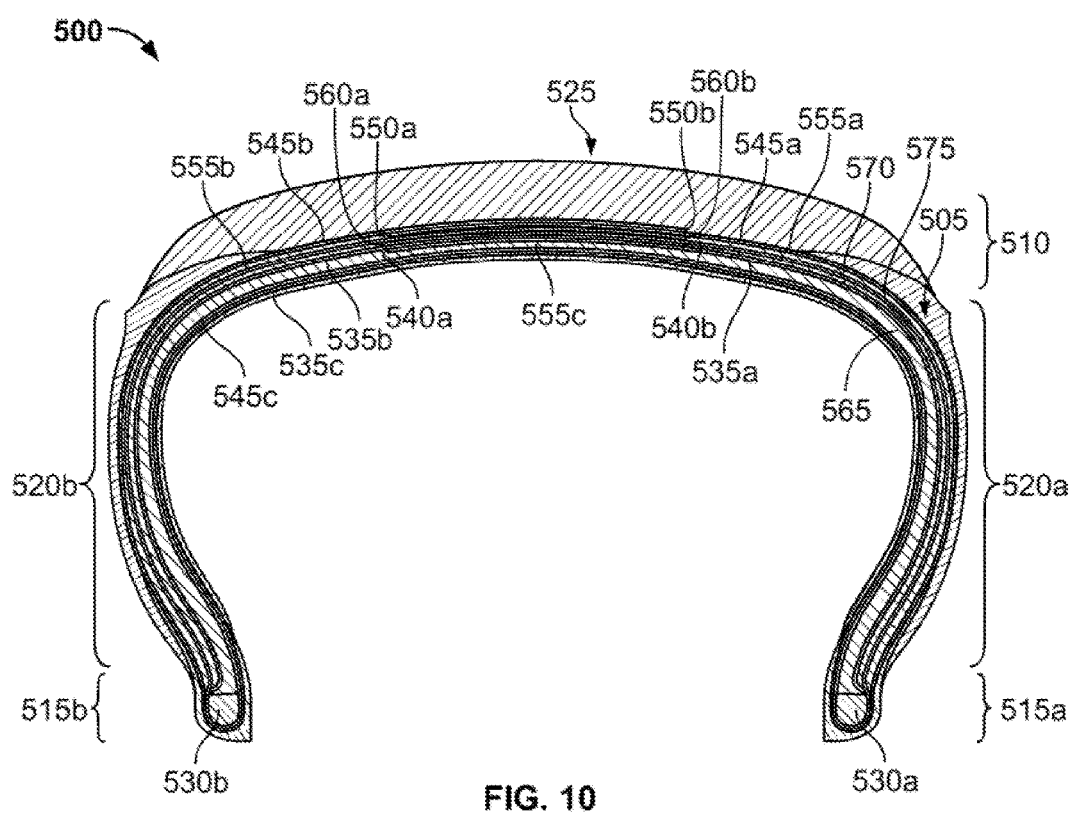
FIG. 10 is a cross-section of a tire 500 having another alternative embodiment of a toroidal element 505 incorporated therein.

FIG. 10 illustrates a cross-section of a tire 500 having an alternative embodiment of a toroidal element 505 incorporated therein. Tire 500 includes a crown region 510, a pair of bead regions 515, including a first bead region 515a and a second bead region 515b, and a pair of sidewall regions 520a,b extending from the crown region 510 to the bead regions 515. A tread 525 is formed in the crown region 510 of the tire. Each bead region 515 includes a bead 530 and may optionally include a bead filler (not shown), a gum abrasion strip (not shown), and other components therein.

Tire 500 further includes a first body ply 535 having a first turned-up portion 535a, a second turned up portion 535b, and a main portion 535c. The main portion 535c extends circumferentially about the tire from a first bead 530a to a second bead 530b. The first turned-up portion 535a extends around the first bead 530a and terminates at a first end 540a in the crown region 510 of the tire 500. The second turned-up portion 535b extends around the second bead 530b and terminates at a second end 540b in the crown region 510 of the tire 400, such that the first turned-up portion 535a overlaps the second turned-up portion 535b.

Tire 500 further includes a second body ply 545 having a first turned-up portion 545a, a second turned up portion 545b, and a main portion 545c. The main portion 545c extends circumferentially about the tire from the first bead 530a to the second bead 530b. The first turned-up portion 545a extends around the first bead 530a and terminates at a first end 550a in the crown region 510 of the tire 500. The second turned-up portion 545b extends around the second bead 530b and terminates at a second end 550b in the crown region 510 of the tire 500, such that the first turned-up portion 545a overlaps the second turned-up portion 545b.

Tire 500 also includes a third body ply 555 having a first turned-up portion 555a, a second turned up portion 555b, and a main portion 555c. The main portion 555c extends circumferentially about the tire from the first bead 530a to the second bead 530b. The first turned-up portion 555a extends around the first bead 530a and terminates at a first end 560a in the crown region 510 of the tire 500. The second turned-up portion 555b extends around the second bead 530b and terminates at a second end 560b in the crown region 510 of the tire 500, such that the first turned-up portion 555a overlaps the second turned-up portion 555b.

In the illustrated embodiment, the toroidal element 505 includes the body ply cords 535, 545, 555 as well as a first inner rubber component 565, a second inner rubber component 570, and a third inner rubber component 575. The first inner rubber component 565 is sandwiched between the main portions 535c, 545c, 555c of the first, second, and third body plies 535, 545, 555 and the turned up portions 535a,b of the first body ply 535. The second inner rubber component 570 is sandwiched between the turned up portions 535a,b of the first body ply 535 and the turned up portions 545a,b of the second body ply 545. The third inner rubber component 575 is sandwiched between the turned up portions 545a,b of the second body ply 545 and the turned up portions 555a,b of the third body ply 555. The toroidal element 505 therefore stretches from bead to bead, and include the beads 530a,b.

Figure 11:
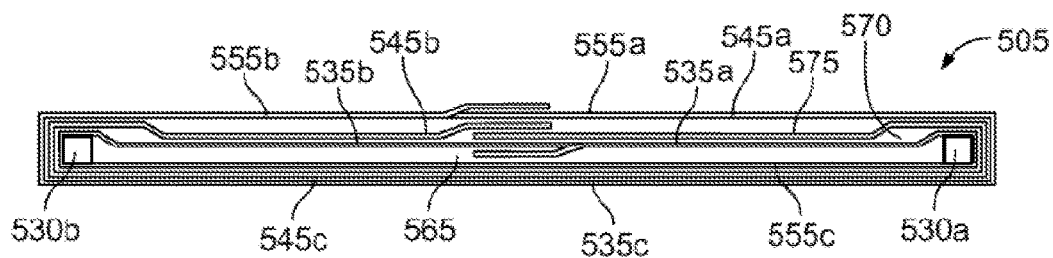
FIG. 11 is a schematic drawing of an alternative embodiment of the toroidal element 505 shown in a straight condition for illustrative purposes.

FIG. 11 is a schematic drawing of one embodiment of the toroidal element 505 of FIG. 10 shown in a straight condition for illustrative purposes. The first inner rubber component 565 is sandwiched between the main portions 535c, 545c, 555c of the first, second, and third body plies 535, 545, 555 and the turned up portions 535a,b of the first body ply 535. The second inner rubber component 570 is sandwiched between the turned up portions 535a,b of the first body ply 535 and the turned up portions 545a,b of the second body ply 545. The third inner rubber component 575 is sandwiched between the turned up portions 545a,b of the second body ply 545 and the turned up portions 555a,b of the third body ply 555. The toroidal element 505 therefore stretches from bead to bead, and include the beads 530a,b. In building a tire, the first, second, and third rubber components 565, 570, 575 may initially be straight, as shown, and then bent to a toroidal shape. Alternatively, the first, second, and third rubber components 565, 570, 575 may be pre-formed in a toroidal shape. In an alternative embodiment (not shown), the toroidal element is a partial toroidal element that extends into one sidewall of the tire, but not both sidewalls.

While the illustrated embodiments generally show a rubber components 565, 570, 575 disposed between main portions 535c, 545c, 555c of body plies and turned-up portions 535a,b, 545a,c, and 555a,b of the body plies, it should be understood that any combination of rubber layers and body ply layers may be employed. The body ply layers may be formed of multiple body plies that form multiple main portions and multiple turned-up portions, or multiple main portions and multiple turned-down portions. The body ply layers may also be formed of separate body plies.

Figure 12:
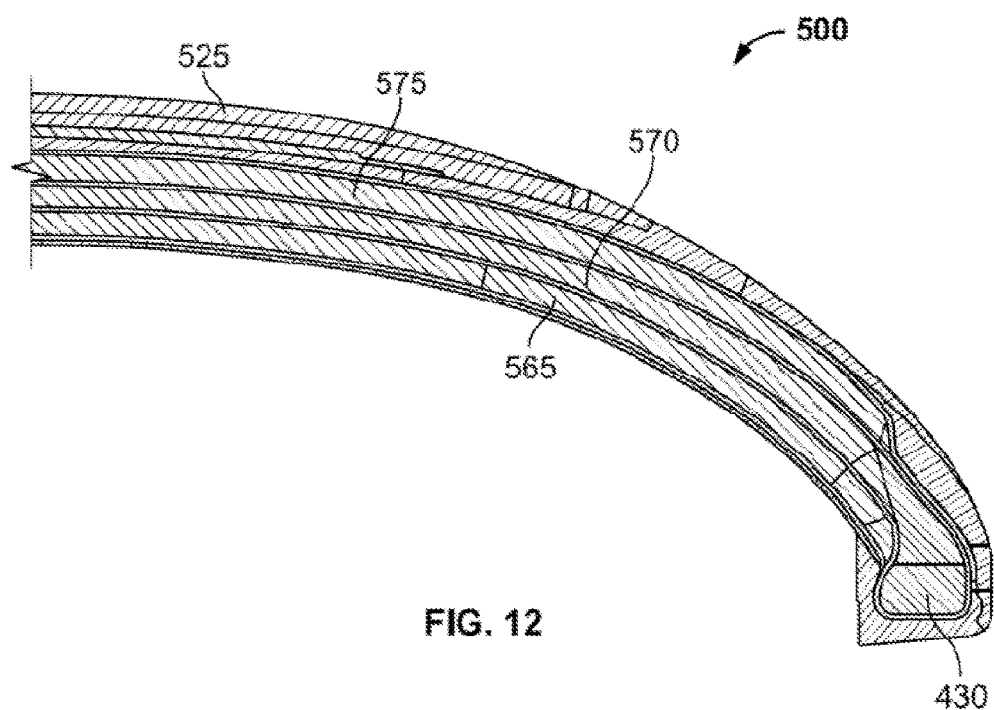
FIG. 12 is a partial cross-section of an alternative embodiment of the tire 500 in an unstressed condition.

FIG. 12 is a cross-section of an alternative embodiment of the tire 500 in an unstressed condition. In this embodiment, the tire 500 is formed with an initial shape as shown. In the illustrated embodiment, the initial shape is substantially parabolic, such that the beads 530a,b are located axially outside and radially below the tread 525. In alternative embodiments (not shown), the initial shape may be any curved shape in which the beads are located axially outside and radially below the tread.

To form the tire shown in FIG. 12, the method includes forming a green tire having a green tread and a pair of beads, with each of the pair of beads being axially outside and radially below the tread. The green tire further includes green sidewall regions extending from the green tread to the bead regions. The green tire also includes a green toroidal element disposed radially below the tread and radially below at least a portion of each sidewall region. The green toroidal element includes a pair of inextensible plies with green rubber disposed between the inextensible plies. In an alternative embodiment, a toroidal element having cured or partially cured rubber disposed between inextensible plies may be employed.

After the green tire is formed, it is cured to form the unstressed tire 500 shown in FIG. 12. A rim (not shown) having a pair of wheel flanges is provided. The pair of beads 530a,b of the unstressed tire 500 are then moved axially inward, such that each of the pair of beads 530a,b is disposed directly below a portion of the tread 525. In an alternative embodiment, the beads remain axially outside the tread 525. The tire 500 is then mounted on the rim by placing bead regions defined by the pair of beads 530a,b in the pair of wheel flanges. The bead regions of the tire 500 are then affixed to the wheel flanges of the rim, thereby forming a pre-stressed tire and rim assembly.

In one embodiment, the bead regions of the tire 500 are affixed to the wheel flanges of the rim by bolts. In alternative embodiments, other fasteners such as screws, glue or other adhesive, compression fit or using bead compression as may be used in existing pneumatic tires may be employed. In another alternative embodiment, the sidewalls of the tire may be affixed to the wheel flange at locations above the bead region of the tire.

In one embodiment, the pair of beads 530a,b of the unstressed tire 500 are moved axially inward by hand. However, this step will more likely be performed by a machine such as a clamping machine using higher forces than today's mounting machines. In one known embodiment, the moving the pair of bead regions axially inward includes applying at least 1000 pounds of force to move the pair of bead regions axially inward. In this embodiment, when the tire is mounted on the rim, the pre-stressed tire applies an outward force of at least 1000 pounds against the wheel flanges. In another known embodiment, the moving the pair of bead regions axially inward includes applying at least 5000 pounds of force to move the pair of bead regions axially inward. In this embodiment, when the tire is mounted on the rim, the pre-stressed tire applies an outward force of at least 5000 pounds against the wheel flanges.

Figure 13B:
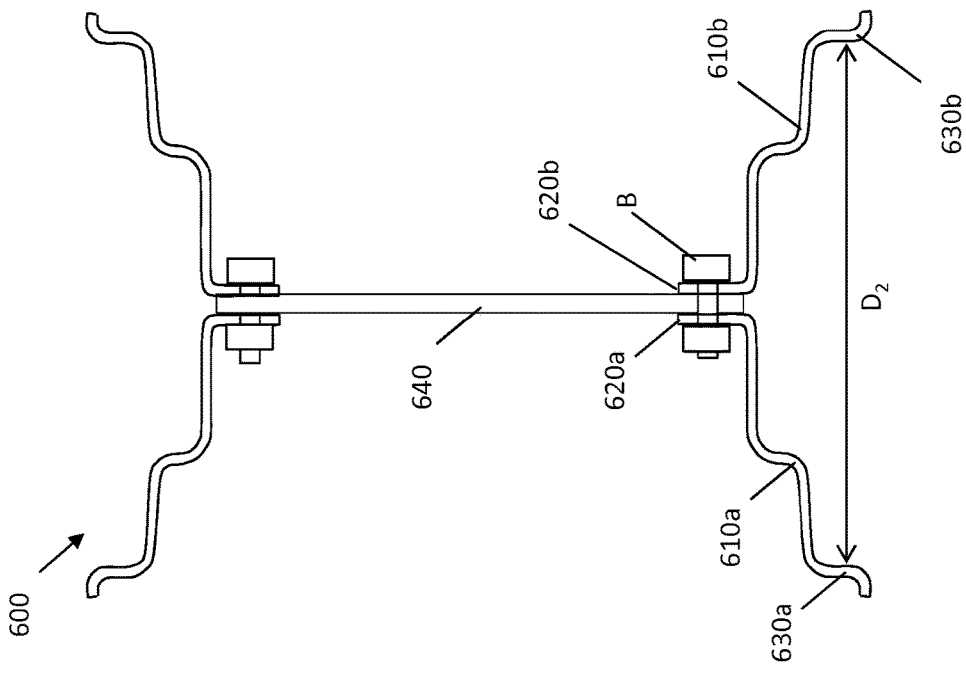
FIGS. 13A and 13B illustrate one embodiment of a two piece wheel configured to receive an unstressed tire.
Figure 13A:
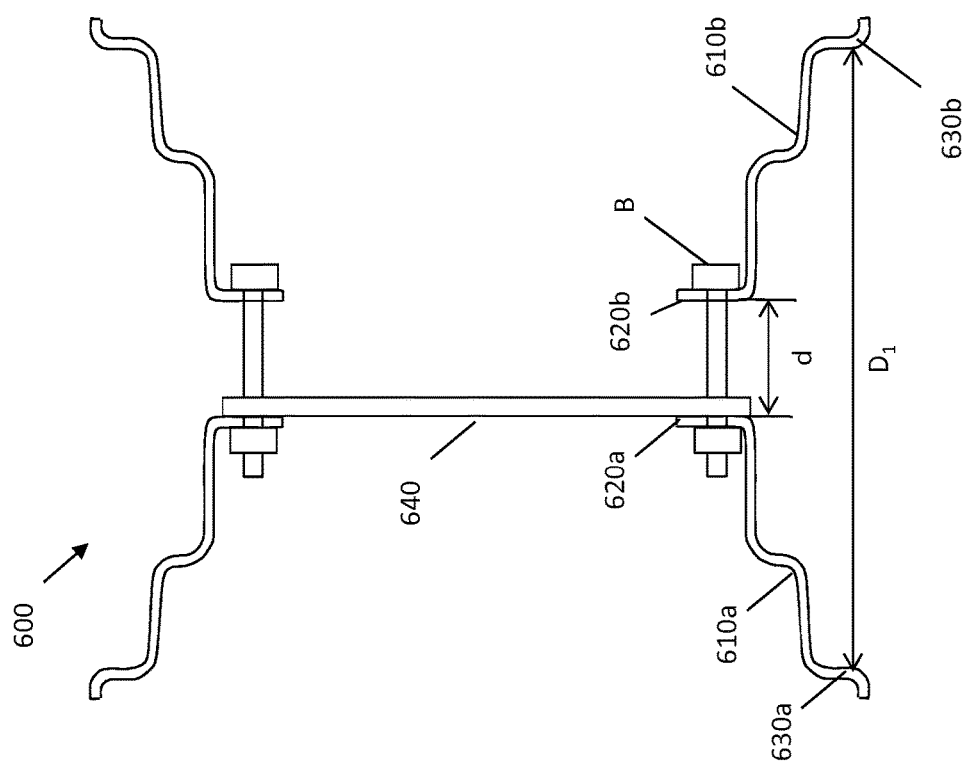

FIGS. 13A and 13B illustrate one embodiment of a two piece wheel 600 configured to receive an unstressed tire. The two piece wheel 600 includes a pair of flanges 610a,b. Each of the flanges 610a,b includes an inner portion 620a,b and an outer portion 630a,b. A central disc is joined to the inner portion 620a of a first flange 610a by a plurality of bolts B. The plurality of bolts B are also joined to the inner portion 620b of a second flange 610b. In an initial state, the inner portions 620a,b of the first and second flanges 610a,b are separated by a distance d and the outer portions 630a,b of the first and second flanges 610a,b are separated by a distance $D_1$. In one embodiment, the bead regions of the tire 500 are placed between the outer portions of the flanges 610a,b of the two piece wheel 600. Clamping pressure is then carefully applied to the unstressed tire by tightening the bolts B until the distance d between the inner portions 620a,b of the first and second flanges 610a,b is reduced to zero. The distance between the outer portions 630a,b of the flanges 610a,b is likewise reduced to $D_2$, creating the desired prestress. In alternative embodiments (not shown) a pair of central discs may be employed, with each disc being joined to a respective flange. In another alternative embodiment (not shown), the central disc may be omitted. It should be understood that alternative fasteners, such as clamps or screws may be used in place of bolts.

Analysis of a pre-stressed tire of the above design shows that the tire would have a contact patch similar to a pneumatic tire, even when no inflation pressure is applied to the tire. This is because the cords develop similar forces in the contact region as the forces generated by the air pressure in a standard pneumatic tire. Compared to other non-pneumatic or runflat designs which rely on stiffness alone to carry the load, the contact of the pre-stressed tire results in a large contact area with lower contact pressure which is more uniform. The design also exhibits lower propensity to buckle in the contact area. Buckling in this manner creates areas of lost contact or high contact pressure in the contact area.

The toroidal element 505 described above includes alternating layers of extensible and substantially inextensible material. While the illustrated embodiment of FIGS. 10-12 shows alternating layers of rubber material and body plies, it should be understood that the layers may include any of the materials described above in alternative embodiments of toroidal elements.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire and rim assembly comprising:
   a rim having a pair of wheel flanges, including a first wheel flange and a second wheel flange;
   a non-pneumatic tire having a crown region and a pair of sidewall regions, including a first sidewall region and a second sidewall region, the non-pneumatic tire comprising:
   a pair of beads, including a first bead and a second bead;
   at least one body defining a plurality of body ply layers;
   a toroidal element located between the body ply layers,
      wherein the toroidal element includes inner and outer regions formed by the body ply layers, and a central region located between the body ply layers,
      wherein at least a portion of the central region is more elastic than the inner and outer regions,
      wherein the toroidal element includes a crown portion extending across the crown region of the tire,
      wherein the toroidal element includes a first sidewall portion extending along at least a portion of the first sidewall region of the tire,
      wherein the toroidal element includes a second sidewall portion extending along at least a portion of the second sidewall region of the non-pneumatic tire, and
      wherein the toroidal element is pre-stressed such that the first sidewall portion of the toroidal element exerts a first axially outward force of at least 1000 pounds against the first wheel flange of the rim, and such that the second sidewall portion of the toroidal element exerts a second axially outward force of at least 1000 pounds against the second wheel flange of the rim.

2. The non-pneumatic tire of claim 1, wherein the central region of the toroidal element includes at least one high stiffness layer between a pair of lower stiffness layers.

3. The non-pneumatic tire of claim 1, wherein the inner region, the outer region, and the central region extend from the first bead to the second bead.

4. The non-pneumatic tire of claim 1, wherein the first sidewall portion of the toroidal element exerts an axially outward force of at least 5000 pounds, and such that the second sidewall portion of the toroidal element exerts an axially outward force of at least 5000 pounds.

5. The non-pneumatic tire of claim 1, wherein the central region includes a first inner rubber component and a second inner rubber component separated by a second body ply.

6. A non-pneumatic tire and rim assembly comprising:
   a rim having a pair of wheel flanges, including a first wheel flange and a second wheel flange;
   a tire fastened to the rim, the non-pneumatic tire including:
   a tread formed in a crown region of the non-pneumatic tire;
   a first sidewall region extending from the crown region to a first bead area, the first sidewall region of the tire being affixed to the first wheel flange of the rim;
   a second sidewall region opposite the first sidewall region, the second sidewall region extending from the crown region to a second bead area, the second sidewall region of the non-pneumatic tire being affixed to the second wheel flange of the rim;
   a toroidal element extending across a crown region of the non-pneumatic tire, further extending along at least a portion of the first sidewall region of the non-pneumatic tire, and further extending along at least a portion of the second sidewall region of the non-pneumatic tire, the toroidal element having a central region located between inner and outer regions,
      wherein the central region is more elastic than the inner and outer regions,
      wherein the toroidal element is pre-stressed such that the toroidal element exerts a first axially outward force of at least 1000 pounds against the first wheel flange of the rim, and
      wherein the toroidal element exerts a second axially outward force of at least 1000 pounds against the second wheel flange of the rim.

7. The non-pneumatic tire and rim assembly of claim 6, wherein the central region of the toroidal element includes a layer of rubber.

8. The non-pneumatic tire and rim assembly of claim 7, wherein the layer of rubber includes a first layer of rubber and a second layer of rubber, separated by a body ply.

9. The non-pneumatic tire and rim assembly of claim 7, wherein the layer of rubber includes a first layer of rubber, a second layer of rubber, and a third layer of rubber, wherein the first layer of rubber and the second layer of rubber are separated by a first body ply, and wherein the second layer of rubber and the third layer of rubber are separated by a second body ply.

10. The non-pneumatic tire and rim assembly of claim 6, wherein the first sidewall region of the tire is bolted to the first wheel flange of the rim and wherein the second sidewall region of the tire is bolted to the second wheel flange of the rim.

11. The non-pneumatic tire and rim assembly of claim 6, wherein the first axially outward force is at least 5000 pounds, and wherein the second axially outward force is at least 5000 pounds.

12. The non-pneumatic tire and rim assembly of claim 6, wherein the inner region, the outer region, and the central region extend from a first bead area to a second bead area.

\* \* \* \* \*